United States Patent
Mettu et al.

(10) Patent No.: US 9,225,602 B2
(45) Date of Patent: Dec. 29, 2015

(54) DYNAMIC GROUPING AND CONFIGURATION OF ACCESS POINTS

(71) Applicant: Aruba Networks, Inc., Sunnyvale, CA (US)

(72) Inventors: Shravan K. Mettu, Redwood City, CA (US); Jackson N. Pang, San Francisco, CA (US); Shyam S. Vaidyanathan, Newark, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 172 days.

(21) Appl. No.: 13/954,816

(22) Filed: Jul. 30, 2013

(65) Prior Publication Data

US 2015/0036488 A1     Feb. 5, 2015

(51) Int. Cl.
    *H04L 12/24*     (2006.01)
    *G06F 9/50*      (2006.01)
    *H04L 29/08*     (2006.01)
    *H04L 12/26*     (2006.01)

(52) U.S. Cl.
    CPC .......... *H04L 41/0893* (2013.01); *G06F 9/5072* (2013.01); *H04L 41/0803* (2013.01); *H04L 67/34* (2013.01); *H04L 41/5009* (2013.01); *H04L 41/5096* (2013.01); *H04L 43/0876* (2013.01); *H04L 43/16* (2013.01)

(58) Field of Classification Search
    None
    See application file for complete search history.

(56) References Cited

U.S. PATENT DOCUMENTS

| | | | |
|---|---|---|---|
| 2004/0185845 A1* | 9/2004 | Abhishek et al. | 455/422.1 |
| 2005/0090263 A1* | 4/2005 | Ebata | 455/453 |
| 2006/0002326 A1* | 1/2006 | Vesuna | 370/328 |
| 2008/0069065 A1* | 3/2008 | Wu et al. | 370/340 |
| 2010/0128662 A1* | 5/2010 | Bye | 370/316 |
| 2012/0088482 A1* | 4/2012 | Pazhyannur et al. | 455/418 |
| 2015/0029879 A1* | 1/2015 | Chou et al. | 370/252 |
| 2015/0036488 A1* | 2/2015 | Mettu et al. | 370/230 |

* cited by examiner

*Primary Examiner* — Benjamin H Elliott, IV
(74) *Attorney, Agent, or Firm* — Mannava & Kang, P.C.

(57) ABSTRACT

A method is described for moving one or more access points between neighboring enterprise networks such that one or more threshold requirements of the networks are met. By reconfiguring access points to move between enterprise networks, the method provides a highly flexible network system that utilizes environmental and/or operational data to dynamically meet the needs of associated client devices and consumers.

28 Claims, 5 Drawing Sheets

DYNAMIC GROUPING AND CONFIGURATION OF ACCESS POINTS

TECHNICAL FIELD

The present disclosure relates to dynamically moving access points between an enterprise network of a first customer to an enterprise network of a second customer based on detected environmental and/or operational parameters of access points in each network.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some environments, multiple wireless networks may be deployed to handle clients and customers in various areas. Each of these wireless networks may include one or more access points that establish data connections with nearby client devices. In some situations, one network may become over-utilized or incapable of meeting standards or general needs of associated client devices. In this situation, a neighboring wireless network may be under-utilized such that this network is able to easily meet the standards and needs of associated client devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
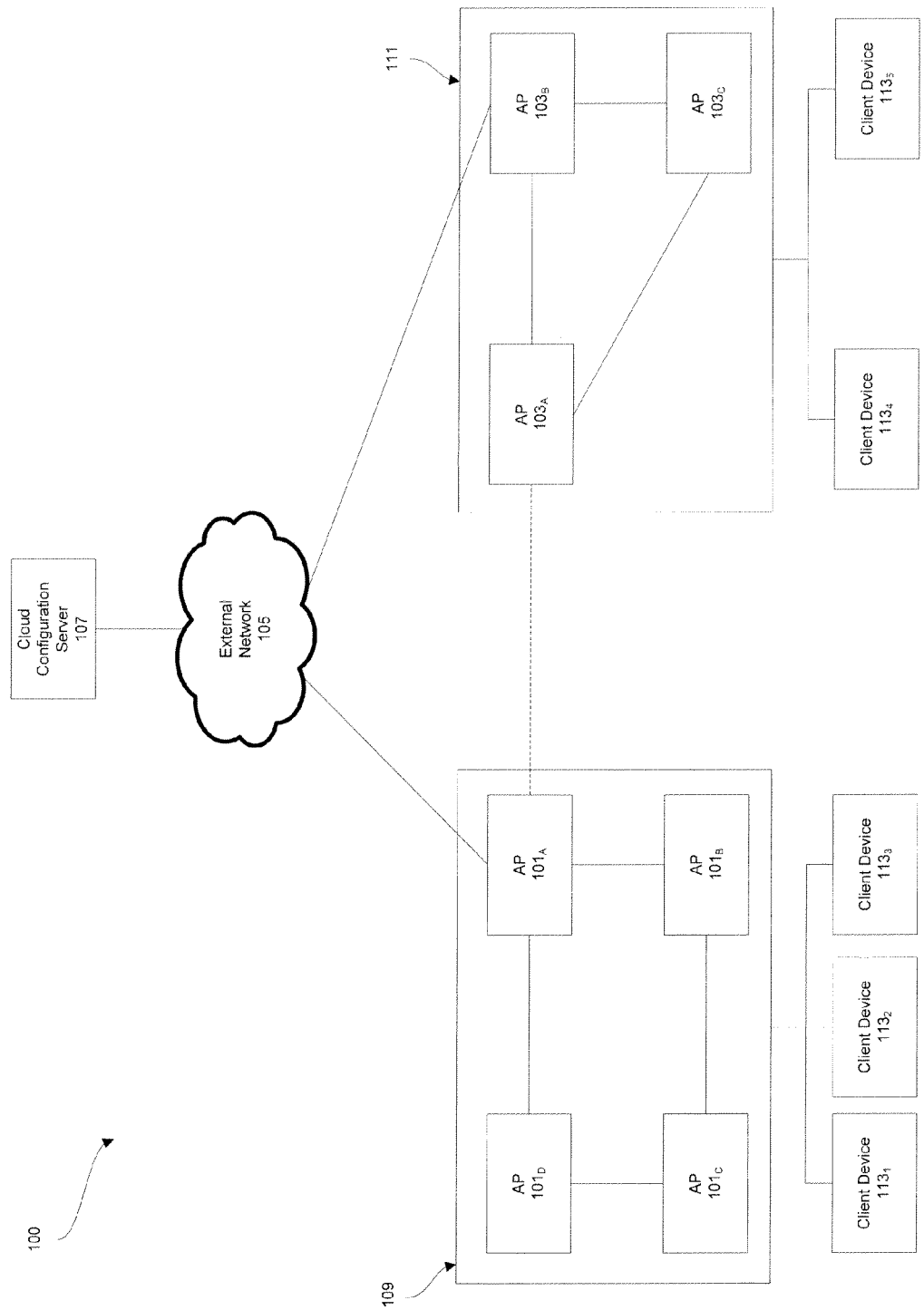
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 shows a block diagram example of a network system 100 in accordance with one or more embodiments. The network system 100, as illustrated in FIG. 1, is a digital system that may include a plurality of digital devices such as one or more access points 101 that form the wireless network 109, one or more access points 103 that form the wireless network 111, and a cloud configuration server 107 that communicates with the access points 102 and 103 through an external network 105. The client devices 113 may be connected or associated with the wireless networks 109 and 111 through corresponding wireless connections with access points 101 and 103, respectively. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional wireless networks separate from the wireless networks 109 and 111.

The access points 101 and 103 may be any device that can associate with the client devices 113 to transmit and receive data over wireless channels. In one embodiment, the access points 101 and 103 may correspond to a network device such as a wireless access point, a switch, a router, or any combination thereof. In some embodiments, the access points 101 and 103 may form a mesh network structure. In these embodiments, the wireless networks 109 and 111 are separate mesh networks and the access points 101 and 103 are mesh nodes within these respective mesh networks 109 and 111. In a mesh network architecture, each mesh node (e.g., the access points 101 and 103) is connected through a wireless or wired medium to one or more other mesh nodes in their respective wireless network 109 or 111. Through this interconnected infrastructure, the access points 101 and 103 may forward and receive data to/from the client devices 113 and to/from other access points 101 and 103 in their corresponding wireless networks 109 and 111. In this configuration, the access points 101 and 103 act as relays for other access points 101 and 103 in their respective wireless networks 109 and 111. Each wireless network 109 and 111 may reside in a separate domain with a discrete service set identifier (SSID) that is broadcast or otherwise advertised to the client devices 113. In some embodiments, an access point 101 and/or 103 may advertise multiple SSIDs corresponding to both wireless networks 109 and 111.

As noted above, the access points 101 and 103 form wireless networks 109 and 111. Each of these wireless networks 109 and 111 serve associated customers over a prescribed physical area. For example, the wireless networks 109 and 111 may be located in neighboring stores in a mall. The customers may be organizations (e.g., business or scholastic institutions) or individuals that are separately billed for network services. As part of their contracted network services, customers may require the networks 109 and 111 meet particular performance standards and/or threshold requirements. In one embodiment, these standards and/or thresholds may be dictated by service level agreements. The service level agreements may indicate assured threshold performance requirements to customers of the wireless networks 109 and 111. For example, the service level agreements may include one or more of (1) client device 113 count on each access point 101 and/or 103 in an associated wireless network 109 and/or 111 to not exceed a predetermined count level and (2) traffic on each access point 101 and/or 103 in an associated wireless network 109 and/or 111 to not exceed a predetermined traffic level. In some embodiments, as will be described in greater detail below, the cloud configuration server 107 or another digital device that maintains a connection between the wireless networks 109 and 111 may be tasked with ensuring that these service level agreements are met by each wireless network 109 and 111 by reconfiguring how access points 101 and 103 are arranged between the networks 109 and 111.

In some embodiments, the access points 101 and 103 may be communicatively coupled to other networks in network system 100. For example, the access points 101 and 103 may be coupled to the external network 105 such that communications may be established with the cloud configuration server 107. The external network 105 may be any network capable of transferring data between the access points 101 and 103 and the cloud configuration server 107. For example, the external network 105 may include one or more wired or wireless routers, switches, and other digital networking devices that operate using one or more protocols (e.g., IEEE 802.3 and IEEE 802.11).

In one embodiment, the access points 101 and 103 may detect environmental and/or operational characteristics, parameters, or values related to the access points 101 and 103. For example, the access points 101 and 103 may each detect (1) the number of client devices 113 connected to each access point 101 and 103, (2) the traffic on each access point 101 and 103, (3) the signal strength of client devices 113 connected to each access point 101 and 103, (4) radio frequency characteristics of the environment surrounding each access point 101 and 103 (e.g., radio frequency interference may be detected in the immediate area surrounding the access point $101_B$ as a result of a proximate microwave oven), and (5) a listing of neighboring access points 101 and 103 in another network 109 and 111 (e.g., the access point $103_A$ may be detected to be visible/in-range in relation to the access point $101_A$ as shown in FIG. 1 by the dashed line).

In one embodiment, the access points 101 and 103 may transmit detected environmental and/or operational parameters to the cloud configuration server 107 over the external network 105. In one embodiment, an access point 101 and 103 may be designated as a master access point in each wireless network 109 and 111. For example, in the wireless network 109, the access point $101_A$ may be designated as the master access point and maintains a connection with the cloud configuration server 107 through the external network 105. Similarly, in the wireless network 111, the access point $103_B$ may be designated as the master access point and maintains a connection with the cloud configuration server 107 through the external network 105. Master access points may collect detected parameters from each other access point 101 and 103 in an associated network 109 and 111. The master access points may thereafter transfer these collective parameters to the cloud configuration server 107 over the external network 105.

Figure 2:
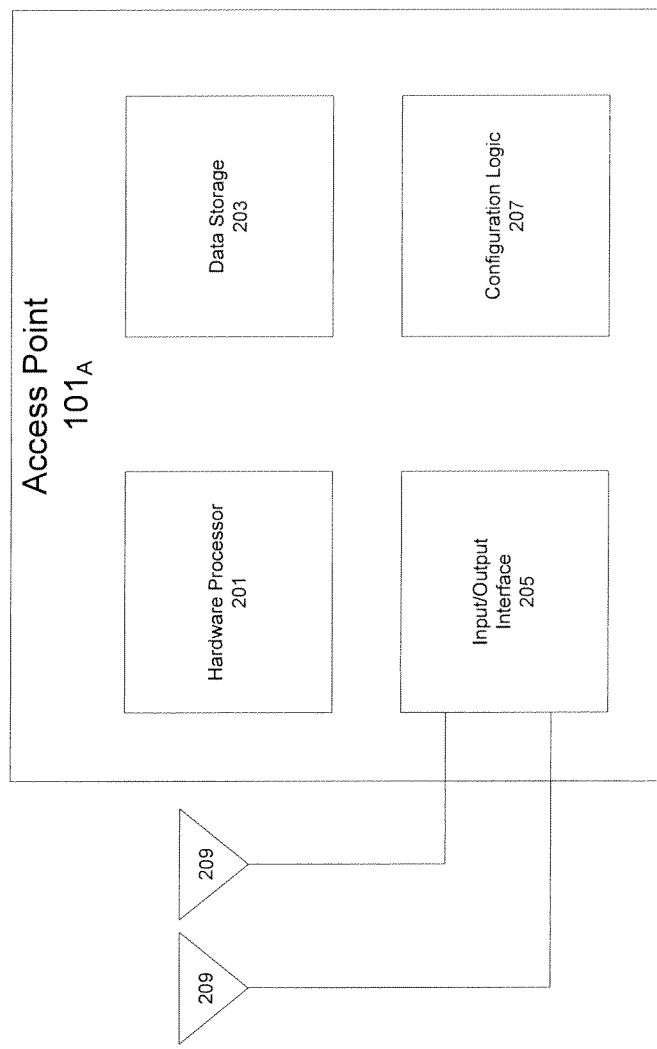
FIG. 2 shows a block diagram example of an access point in accordance with one or more embodiments.

As described above, the access points 101 and 103 may be digital network devices. FIG. 2 shows a component diagram of the access point $101_A$ according to one embodiment. In other embodiments, the access points $101_B$-$101_D$ and $103_A$-$103_C$ may include similar or identical components to those shown and described in relation to the access point $101_A$.

As shown in FIG. 2, the access point $101_A$ may comprise one or more of: a hardware processor 201, data storage 203, an input/output (I/O) interface 205, and device configuration logic 207. Each of these components of the access point $101_A$ will be described in further detail below.

The data storage 203 of the access point $101_A$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the access point $101_A$. In one embodiment, the data storage 203 is a distributed set of data storage components. The data storage 203 may store data that is to be transmitted from the access point $101_A$ or data that is received by the access point $101_A$. For example, the access point $101_A$ may store data to be forwarded to a client device 113 or to one or more of the access points $101_B$-$101_D$. In another embodiment, the data storage 203 may store environmental and/or operational parameters detected by the access point $101_A$ and/or parameters collected from the other access points $101_B$-$101_D$ in the wireless network 109. These environmental and operational parameters may be stored within the data storage 203 before being analyzed or being forwarded to the cloud configuration server 107.

In one embodiment, the I/O interface 205 corresponds to one or more components used for communicating with other devices (e.g., the client devices 113 and/or other access points $101_B$-$101_D$ within the network 109) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices 113 and the access points $101_B$-$101_D$ over corresponding wireless channels in the system 100. In one embodiment, the I/O interface 205 facilitates communications between the access point $101_A$ and the access points $101_B$-$101_D$ such that the access points $101_A$-$101_D$ may form a mesh network structure as described above. In these embodiments, the wireless network 109 is a mesh network and the access points $101_A$-$101_D$ are mesh nodes within this mesh network 109.

In some embodiments, the I/O interface 205 may include one or more antennas 209 for communicating with the client devices 113, the access points $101_B$-$101_D$, and/or other wireless devices in the network system 100. For example, multiple antennas 209 may be used for forming transmission beams to one or more of the client devices 113 or the access points $101_B$-$101_D$ through adjustment of gain and phase values for corresponding antenna 209 transmissions. The generated beams may avoid objects and create an unobstructed path to the client devices 113 and/or the access points $101_B$-$101_D$.

In one embodiment, the I/O interface 205 in conjunction with the antennas 209 may detect wireless signals emitted by the access points 103 in the wireless network 111. In this embodiment, the access point $101_A$ may not associate or maintain a connection with any of the access points $103_A$-$103_C$ in wireless network 111, but the access point $101_A$ is able to detect the presence of proximate/neighboring access points 103, including signal strength characteristics. For example, in FIG. 1 the dashed line indicates that the access point $103_B$ is visible to and/or in-range of the access point $101_A$ although these access points $101_A$ and $103_B$ may not share a data connection.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_A$. In one embodiment, the device configuration logic 207 may be configured to allow the access point $101_A$ to join and change between networks 109 and 111.

In one embodiment, the access point $101_A$ is an instant access point (IAP). As an IAP, the access point $101_A$ does not rely on a centralized external controller for performing security and authentication operations for communications between the client devices 113, the other access points $101_B$-$101_D$ within the wireless network 109, and/or the cloud configuration server 107.

As described above, the other access points $101_B$-$101_D$ and $103_A$-$103_C$ may be similarly configured as described above in relation to access point $101_A$. For example, access points $101_B$-$101_D$ and $103_A$-$103_C$ may comprise hardware processor 201, data storage 203, an input/output (I/O) interface 205, and device configuration logic 207 in a similar fashion as described above in relation to the access point $101_A$.

In one embodiment, the client devices 113 may be any wireless or wired electronic devices capable of receiving and transmitting data over wired and wireless mediums. For example, the client devices 113 may be one or more of personal computers, laptop computers, netbook computers, wireless music players, portable telephone communication devices, smart phones, tablets, and digital televisions. In one embodiment, the client devices 113 are digital devices that include a hardware processor, memory hierarchy, and input/output (I/O) interfaces including a wired and/or wireless interface such as an IEEE 802.3 interface. In one embodiment, the configuration of the components within the client devices 113 may be similar to those discussed above in relation to the access point $101_A$.

In one embodiment, the cloud configuration server 107 may be any wireless or wired electronic devices capable of receiving and transmitting data over wired and wireless mediums. For example, the cloud configuration server 107 may be a personal computer, a laptop computer, a netbook computer, or any other computing device. In one embodiment, the cloud configuration server 107 is a digital device that includes a hardware processor, memory hierarchy, and input/output (I/O) interfaces including a wired and/or wireless interface such as an IEEE 802.3 interface. In one embodiment, the configuration of the components within the cloud configuration server 107 may be similar to those discussed above in relation to the access point $101_A$.

In one embodiment, the cloud configuration server 107 may receive and store environmental and operational parameters received from one or more of the access points $101_A$-$101_D$ and $103_A$-$103_C$ along with standards and threshold requirements for each wireless network 109 and 111. These standards and threshold requirements may be defined in a set of service level agreements stored on the cloud configuration server 107. In some embodiments, the cloud configuration server 107 may also store network configuration information for each network 109 and 111. This network configuration information may be passed to one or more access points 101 and 103 such that the access points 101 and 103 may join/associate with a corresponding wireless network 109 and 111.

Figure 4:
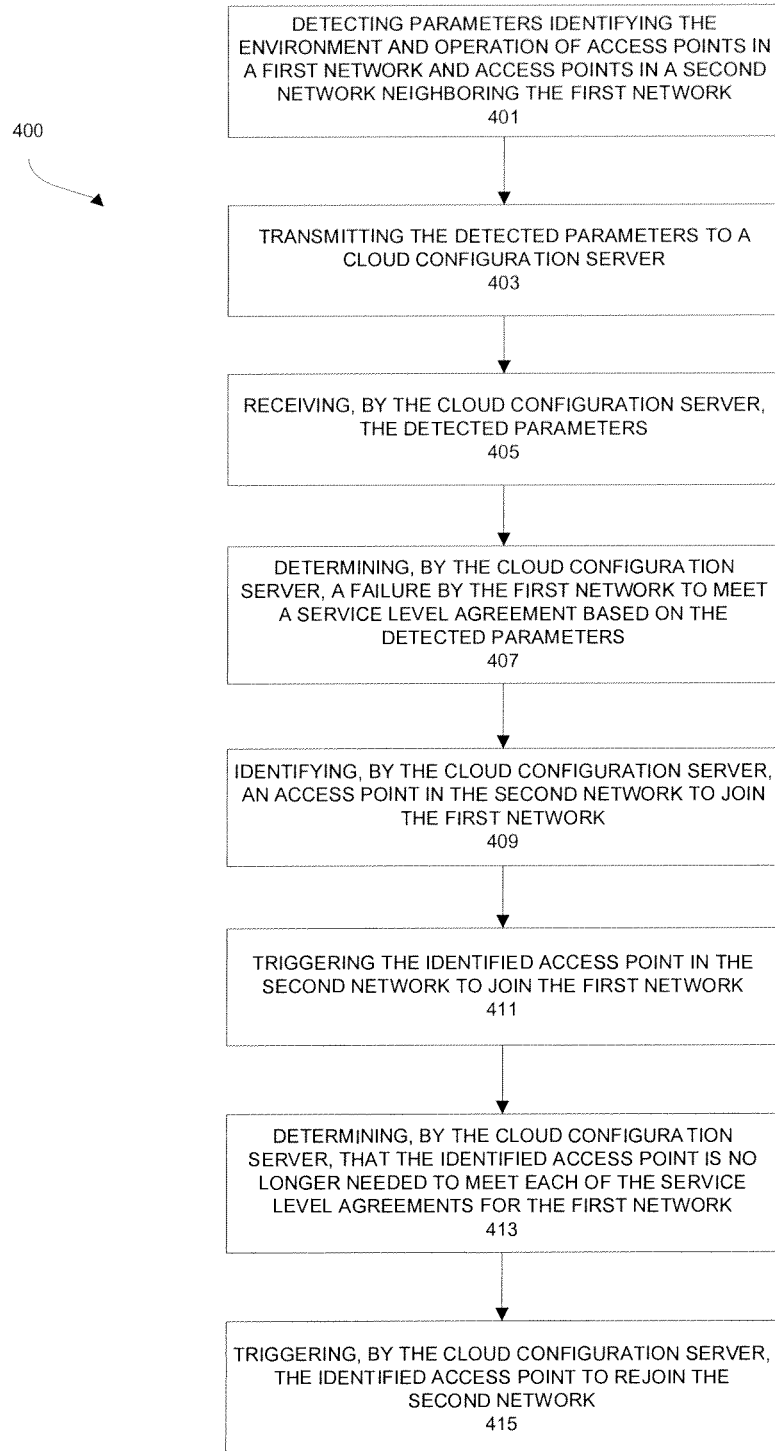
FIGS. 4 and 5 show methods for dynamically grouping and configuring access points between neighboring wireless networks in accordance with one or more embodiments.

FIG. 4 shows a method 400 for dynamically grouping and configuring access points 101 and 103 between the wireless networks 109 and 111 based on detected environmental and/or operational parameters. The method 400 may be performed by one or more devices in network system 100. For example, the method 400 may be performed by the cloud configuration server 107 in conjunction with one or more of the access points 101 and 103.

The method 400 may begin at operation 401 with one or more access points 101 and 103 detecting environmental and/or operational characteristics, parameters, or values related to the access points 101 and 103. For example, the access points 101 and 103 may each detect (1) the number of client devices 113 each access point 101 and 103 is connected to or associated with, (2) the amount of traffic on each access point 101 and 103, (3) the signal strength of the client devices 113 connected to or associated with each access point 101 and 103, (4) radio frequency characteristics of the environment surrounding each access point 101 and 103 (e.g., radio frequency interference may be detected in the immediate area surrounding the access point $101_B$ as a result of a proximate microwave oven), and (5) a listing of neighboring access points 101 and 103 in another network 109 and 111 (e.g., the access point $103_3$ may be detected to be visible/in-range in relation to the access point $101_A$). For example, at operation 401 the access point $101_A$ may determine that two client devices 113 are connected to it, the traffic on the access point $101_A$ is 20 Mbps, the signal strength of each client device 113 connected to the access point $101_A$ is 10 dBm and 20 dBm, respectively, there is high distortion in the 2.4 Ghz band surrounding the access point $101_A$, and the access point $103_A$ is proximate to the access point $101_A$. Each access point 101 and 103 may detect similar parameters at operation 401 based on their own environmental and/or operational characteristics.

After detecting environmental and/or operational parameters associated with each access point 101 and 103, operation 403 transmits these detected parameters to the cloud configuration server 107. The transmission may be performed over external network 105 using any known set of transmission protocols or standards (e.g., IEEE 802.3 and IEEE 802.11). In one embodiment, a master access point may be designated or elected in each network 109 and 111. For example, in the wireless network 109, the access point $101_A$ may be designated as the master access point and maintains a connection with the cloud configuration server 107 through the external network 105. Similarly, in the wireless network 111, the access point $103_B$ may be designated as the master access point and maintains a connection with the cloud configuration server 107 through the external network 105. In this embodiment, each access point $101_B$-$101_D$, $103_A$, and $103_C$ transmits parameters detected at operation 401 to the master access points $101_A$ and $103_B$, respectively. These master access points $101_A$ and $103_B$ may transmit the collected parameters from each of the access points 101 and 103 in their respective networks 109 and 111 to the cloud configuration server 107 at operation 403.

At operation 405, the environmental and/or operational parameters are received by the cloud configuration server 107. The cloud configuration server 107 may thereafter process the received parameters as will be described in further detail below. Although described in relation to a separate digital device receiving and analyzing the detected parameters (e.g., the cloud configuration server 107), in other embodiments an access point 101 within the network 109 may analyze the parameters and trigger an access point 103 in the network 111 to join the network 109 without assistance from a device external to the networks 109 and 111. This configuration will be discussed in further detail in relation to FIG. 5.

At operation 407, the received parameters are analyzed to determine whether one or more standard and/or threshold requirements for the wireless networks 109 and 111 have not been met. As noted above, these standards and/or threshold requirements may be dictated by service level agreements between customers and operators of the networks 109 and 111. For example, a threshold requirement for the wireless network 109 may be that each access point 101 not exceed a traffic limit of 15 Mbps. In the example above in relation to operation 401, 20 Mbps traffic was detected on the access point $101_A$. Accordingly, in this example the threshold requirement for traffic not exceeding 15 Mbps on each access point 101 in wireless network 109 has been violated and operation 407 would detect a failure to meet the threshold requirement.

In one embodiment, the threshold requirements for the network 109 are determined relative to a schedule with a designated time. For example, a threshold requirement for the network 109 may indicate that a particular amount of client devices 113 and/or a particular amount of traffic is needed at a designated time. Accordingly, the cloud configuration server 107 may determine whether the current set of access points 101 in the network 109 can meet this scheduled threshold requirement at operation 407.

Following a determination that a threshold requirement for the wireless network 109 has not been met, operation 409 attempts to identify an access point 103 in the wireless network 111 that may be moved over to wireless network 109 such that the violated threshold requirement of the network 109 is now met. The identified access point 103 must have the capacity and positioning to handle the needs of the wireless network 109 such that any violated threshold requirements are now met. For example, an identified access point 103 must be proximate to the wireless network 109 and/or one or more overloaded access points 101 such that the identified access point 103 may effectively associate with client devices 113 in the area of the wireless network 109. Although the networks 109 and 111 serve separate areas, the close proximity between the networks 109 and 111 may allow one or more of the access points 103 in the network 111 to provide service to client devices 113 in the area of the network 109. The positioning of the access points 103 relative to the access points 101 may be determined based on detected parameters received from the access points 101 and 103 at operation 401. For example, a listing of neighboring access points 103 in the network 111 may be detected by each access point 101 at operation 401.

In one embodiment, operation 409 is performed such that wireless network 111 does not fail to meet any of its own threshold requirements. For example, removing the access point $103_A$ from network 111 and moving it to the network 109 may allow the network 109 meet each of its threshold requirements; however, this adjustment may result in the network 111 failing one or more of its own threshold requirements. Accordingly, operation 409 must identify and access point 103 for movement to the network 109 that will not cause the network 111 to fail to meet its own threshold requirements.

Although described in relation to identifying a single access point 103 in the network 111, in some embodiments multiple access points 103 may be identified to move to the network 109. The multiple identified access points 103 may collectively allow the network 109 to meet each of its threshold requirements.

In one example, operation 409 may identify the access point $103_A$ to join the network 109. In this example, the cloud configuration server 107 may determine based on environmental and/or operational parameters received at operation 405, that the access point $103_A$ is properly positioned to alleviate congestion or other issues with the network 109 such that the network 109 may meet each of its threshold requirements without causing the network 111 to violate any of its own threshold requirements. The access point $103_A$ will be used hereinafter as the identified access point that will move from the network 109 to the network 111. However, in other embodiments another access point 103 may be selected to move from the network 109 to the network 111.

Figure 3:
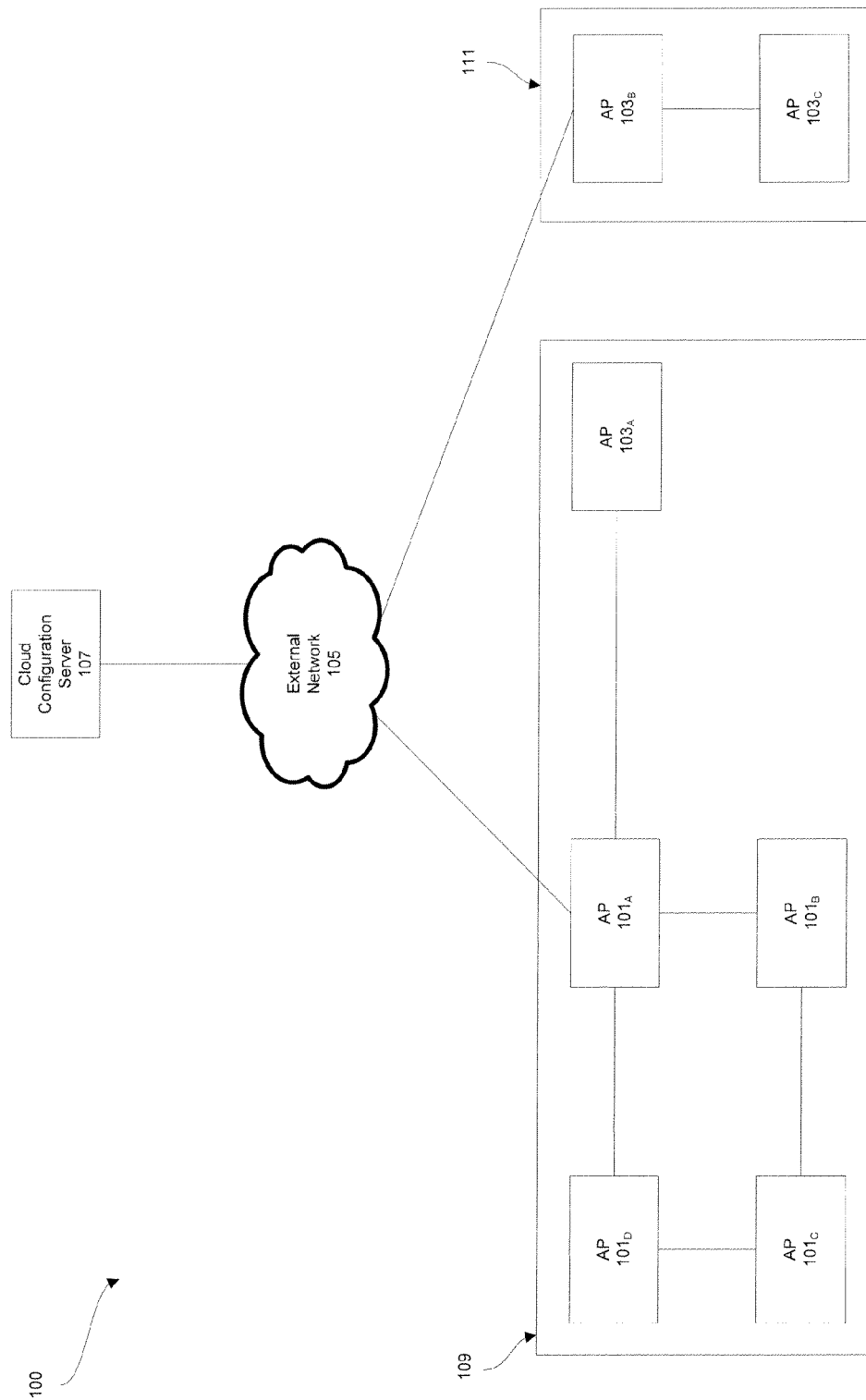
FIG. 3 shows a network system after an access point from a second network has joined a first network in accordance with one or more embodiments.

At operation 411, the cloud configuration server 107 triggers the identified access point $103_A$ to join the network 109 as shown in FIG. 3. In one embodiment, the cloud configuration server 107 may store configuration data for both the wireless network 109 and the wireless network 111. The configuration data allows access points 101 and 103 to join each network 109 and 111, respectively. In one embodiment, the cloud configuration server 107 triggers the identified access point 103$_A$ in the wireless network 111 to join the wireless network 109 by transmitting a request to the identified access point 103$_A$ along with corresponding configuration information for the network 109. In one embodiment, the request and the configuration information are routed through master access point 103$_B$ in the network 111. Upon receipt of the configuration information, the identified access point 103$_A$ may break from the network 111 and beacon for the master access point 101$_A$ in the network 109. The identified access point 103$_A$ may modify at least a portion of its own configuration using the received configuration information and thereafter join the network 109. By joining the network 109, the identified access point 103$_A$ will (1) advertise the same SSID, (2) be part of the same IP subnet, and/or (3) point to the same virtual local area network (VLAN) as the access points 101$_A$-101$_D$.

In one embodiment, the identified access point 103$_A$ may simultaneously be connected to both the networks 109 and 111. For example, at operation 411 the identified access point 103$_A$ may join the network 109 while maintaining a connection with the network 111. In this example, the identified access point 103$_A$ simultaneously advertises SSIDs for both the networks 109 and 111.

In one embodiment, the identified access point 103$_A$ may remain in the network 109 until the cloud configuration server 107 determines that the identified access point 103$_A$ is no longer needed to meet each of the network 109's threshold requirements at operation 413. For example, the access points 101$_A$-101$_D$ and 103$_A$ may be in network 109. In this scenario, the access point 103$_A$ was identified at operation 409 and triggered to move from the network 111 to the network 109 at operation 411 such that the network 109 may meet each of its threshold requirements. However, after monitoring environmental and/or operational parameters periodically received from each access point 101$_A$-101$_B$ and 103$_A$, the cloud configuration server 107 may determine at operation 413 that the identified access point 103$_A$ is no longer needed in the network 109 for the network 109 to meet each of its threshold requirements. This may be caused in a drop in client devices 113 associated with the network 109 or other similar factors. Alternatively, in one embodiment, the cloud configuration server 107 may determine at operation 413 that the access point 103$_A$ is needed in the network 111 such that the network 111 can meet its own threshold requirements.

Based on the determined need for the access point 103$_A$ in the network 111 and/or the lack of need for the access point 103$_A$ in the network 109, the cloud configuration server may trigger the access point 103$_A$ to rejoin the network 111 at operation 415. As described above, the cloud configuration server 107 may store configuration data for both the wireless network 109 and the wireless network 111. In one embodiment, the cloud configuration server 107 triggers the identified access point 103$_A$ in the wireless network 109 to rejoin the wireless network 111 by transmitting a request to the identified access point 103$_A$ along with corresponding configuration information for the network 111. In one embodiment, the request and the configuration information are routed through master access point 101$_A$ in the network 109. Upon receipt of the configuration information, the identified access point 103$_A$ may break from the network 109 and beacon for the master access point 103$_B$ in the network 111. The identified access point 103$_A$ may modify at least a portion of its own configuration using the received configuration information and thereafter rejoin the network 111. By joining the network 111, the identified access point 103$_A$ will (1) advertise the same SSID, (2) be part of the same IP subnet, and/or (3) point to the same virtual local area network (VLAN) as the access points 103$_B$ and 103$_C$.

As described above, the method 400 moves one or more access points 103 between the network 111 and the neighboring network 109 such that one or more threshold requirements of the network 109 are met. By reconfiguring the access points 101 and 103 to move between the networks 109 and 111, the method 400 provides a highly flexible network system 100 that utilizes environmental and/or operational data to dynamically meet the needs of client devices 113 and consumers using available resources of under-utilized nearby networks.

Figure 5:
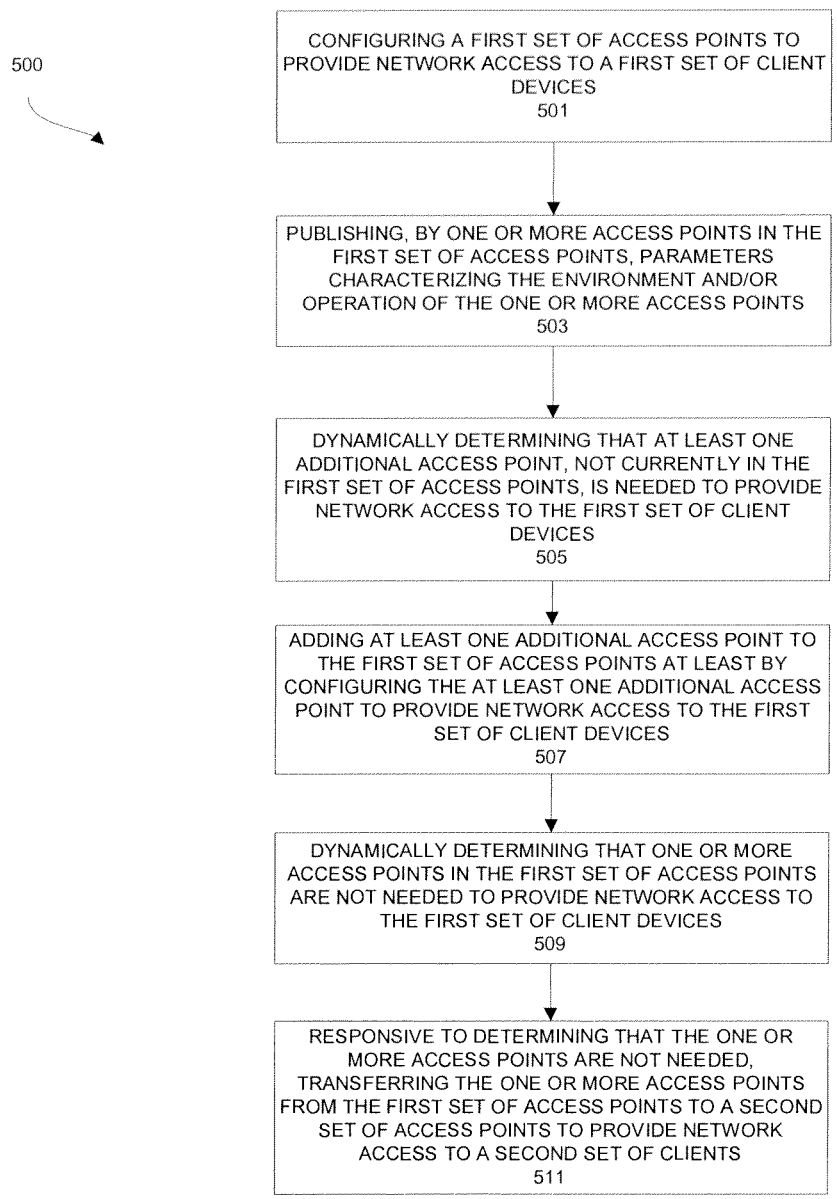

The method 400 was described above in relation to the cloud configuration server 107. In some embodiments, the cloud configuration server 107 may be replaced by one or more access points 101 and/or 103 in the wireless networks 109 and 111. FIG. 5 shows a method 500 for dynamically grouping and configuring access points 101 and 103 between the wireless networks 109 and 111 based on detected environmental and/or operational parameters. The method 500 may be performed by one or more of the access points 101 and 103 in conjunction with other digital devices in the network system 100.

The method 500 may begin at operation 501 with the access points 101 being configured to provide network access to a first set of client devices 113$_1$-113$_3$. The configuration may be performed automatically by the access points 101 themselves through the construction of a mesh enterprise network 109. The network 109 may provide Internet access or other network services through a gateway.

At operation 503, one or more of the access points 101 in the network 109 may publish environmental and/or operational characteristics, parameters, or values related to the access points 101. For example, the access points 101 may each publish (1) the number of client devices 113 each access point 101 is connected to or associated with, (2) the amount of traffic on each access point 101, (3) the signal strength of the client devices 113 connected to or associated with each access point 101, (4) radio frequency characteristics of the environment surrounding each access point 101 (e.g., radio frequency interference may be detected in the immediate area surrounding the access point 101$_B$ as a result of a proximate microwave oven), and (5) a listing of neighboring access points 103 in another network 111 (e.g., the access point 103$_B$ may be detected to be visible/in-range in relation to the access point 101$_A$). The access points 103 in the network 111 may publish similar detected parameters at operation 503 as well.

In one embodiment, the publication of these detected parameters may be to a master access point in the network 109. In this embodiment, a master access point may be designated or elected in each network 109 and 111. For example, in the wireless network 109, the access point 101$_A$ may be designated as the master access point. Similarly, in the wireless network 111, the access point 103$_B$ may be designated as the master access point.

At operation 505, the method 500 determines that at least one additional access point, not currently in the network 109, is needed to provide network access to the client devices 113$_1$-113$_3$. In one embodiment, this determination may be made based on (1) determining at runtime of the network 109 that a current number of client devices 113 associated with the network 109 is above a particular threshold; (2) determining at runtime of the network 109 that a current traffic load at, at least one of the access points 101 in the network 109 is above a particular threshold, (3) determining that a received signal strength for one or more signals transmitted between one or more of the client devices $113_1$-$113_3$ and one or more of the access points 101 in the network 109 is below a particular threshold, and/or (4) determining an access point 103 in the network 111 is better suited to provide network access to one or more of the client devices $113_1$-$113_3$ than at least one access point 101 in the network 109. In one embodiment, these standards and/or thresholds may be dictated by service level agreements.

In one embodiment, the service level agreements for the network 109 are determined relative to a schedule with a designated time. For example, a service level agreement for the network 109 may indicate that a particular amount of client devices 113 and/or a particular amount of traffic is needed at a designated time. Accordingly, the cloud configuration server 107 may determine whether the current set of access points 101 in the network 109 can meet this scheduled service level agreement at operation 505 or whether at least one additional access point, not currently in the network 109, is needed to provide network access to the anticipated client devices 113.

In one embodiment, this determination may be made by the master access point $101_A$ in the network 109. For example, the master access point $101_A$ may receive detected parameters from each access point in the network 109 and determine whether each service level agreement for the network 109 is met based on these detected parameters such that network access is provided to the client devices $113_1$-$113_3$ in the network 109. In one embodiment, this determination at operation 505 may be made in conjunction with the master access point $103_B$ of the network 111.

Following the determination that at least one additional access point, not currently in the network 109, is needed to provide network access to the client devices $113_1$-$113_3$, operation 507 adds at least one access point to the network 109 as shown in FIG. 3. Adding the additional access points to the network 109 allows the network 109 to meet each of its threshold requirements. For example, the additional access points may increase the capacity of the network 109 or increase the signal strength to one or more of the client devices $113_1$-$113_3$. In one embodiment, the master access point $101_A$ adds the additional access points to the network 109 based on a listing of stored access points. The listing may include identifying information of access points not currently in but available to join the network 109. In one embodiment, one or more of the access points 103 in the network 111 are added to the network 109 at operation 109. The determination of which and how many access points 103 may be made by the master access point $101_A$ such that the network access for the client devices $113_1$-$113_3$ is provided without restricting network access to the client devices $113_4$ and $113_5$ in the network 111.

In one embodiment, operation 507 may transmit a request to join and configuration information corresponding to the network 109 to the one or more identified access points 103 in the network 111. For example, operation 507 may send a request and configuration information to the access point $103_A$. Upon receipt of the configuration information, the identified access point $103_A$ may break from the network 111 and beacon for the master access point $101_A$ in the network 109. The identified access point $103_A$ may modify at least a portion of its own configuration using the received configuration information and thereafter join the network 109. By joining the network 109, the identified access point $103_A$ will (1) advertise the same SSID, (2) be part of the same IP subnet, and/or (3) point to the same virtual local area network (VLAN) as the access points $101_A$-$101_D$.

In one embodiment, the identified access point $103_A$ may simultaneously be connected to both the networks 109 and 111. For example, at operation 507 the identified access point $103_A$ may join the network 109 while maintaining a connection with the network 111. In this example, the identified access point $103_A$ simultaneously advertises SSIDs for both the networks 109 and 111.

At operation 509, the method 500 may determine that one or more access points 101 in the network 109 are not needed to provide network access to the client devices $113_1$-$113_3$. For example, the previously identified access points $103_A$ may no longer be needed by the network 109 to provide network access to the client devices $113_1$-$113_3$. This may be caused in a drop in client devices 113 associated with the network 109 or other similar factors. Alternatively, in one embodiment, operation 509 may determine that the access point $103_A$ is needed in the network 111 such that the network 111 can provide network access to the client devices $113_4$ and $113_5$.

Based on the determined need for the access point $103_A$ in the network 111 and/or the lack of need for the access point $103_A$ in the network 109, operation 511 may trigger the access point $103_A$ to rejoin the network 111. In one embodiment, operation 511 triggers the identified access point $103_A$ in the wireless network 109 to rejoin the wireless network 111 by transmitting a request to the identified access point $103_A$ along with corresponding configuration information for the network 111. In one embodiment, the request and the configuration information are received from the master access point $101_A$ in the network 109. Upon receipt of the configuration information, the identified access point $103_A$ may break from the network 109 and beacon for the master access point $103_B$ in the network 111. The identified access point $103_A$ may modify at least a portion of its own configuration using the received configuration information and thereafter rejoin the network 111. By joining the network 111, the identified access point $103_A$ will (1) advertise the same SSID, (2) be part of the same IP subnet, and/or (3) point to the same virtual local area network (VLAN) as the access points $103_B$ and $103_C$.

As described above, the method 500 moves one or more access points 103 between the network 111 and the neighboring network 109 such that network access is provided to client devices 113 connected to the network 109. By reconfiguring the access points 101 and 103 to move between the networks 109 and 111, the method 500 provides a highly flexible network system 100 that utilizes environmental and/or operational data to dynamically meet the needs of client devices 113 and consumers using available resources of under-utilized nearby networks.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes the one or more hardware processors to:
configure a first set of access points to provide network access to a first set of client devices;
dynamically determine that at least one additional access point, not currently in the first set of access points, is needed to provide network access to the first set of client devices; and
add at least one additional access point to the first set of access points at least by configuring the at least one additional access point to provide network access to the first set of client devices, wherein the at least one additional access point is transferred from a first enterprise network to a second enterprise network that comprises the first set of access points.

2. The medium of claim 1, wherein to configure the at least one additional access point to provide network access to the first set of client devices, the one or more hardware processors are further to modify at least a portion of a configuration of the at least one access point to match a configuration shared across all access points in the first set of access points providing network access to the first set of client devices.

3. The medium of claim 1, wherein to dynamically determine that at least one additional access point is needed, the one or more hardware processors are further to determine at runtime that a current number of client devices in the first set of client devices is above a particular threshold or that a current traffic load of at least one of the first set of access points is above a particular threshold.

4. The medium of claim 1, wherein the one or more hardware processors are further to dynamically determine that at least one additional access point is needed based on a schedule identifying a number of client devices or a load associated with client devices to be included in the first set of client devices at a particular time.

5. The medium of claim 1, wherein to add the at least one additional access point to the first set of access points, the one or more hardware processor are further to remove the at least one additional access point from a second set of access points providing network access to a second set of client devices.

6. The medium of claim 1, wherein to dynamically determine that at least one additional access point is needed, the one or more hardware processors are further to determine that a received signal strength for one or more signals transmitted between a particular client device in the first set of client devices and a particular access point in the first set of access points is below a particular threshold.

7. The medium of claim 1, wherein to dynamically determine that at least one additional access point is needed, the one or more hardware processors are further to determine that the additional access point is better suited to provide network access to a particular client device in the first set of client devices than at least one access point in the first set of client devices.

8. The medium of claim 1, wherein to add the at least one additional access point to the first set of access points, the one or more hardware processors are to configure the at least one additional access point to advertise a same SSID as other access points in the first set of access points.

9. A non-transitory computer readable medium comprising instructions which, when executed by one or more hardware processors, causes the one or more hardware processors to:
configure a first set of access points to provide network access to a first set of client devices;
dynamically determine that one or more access points in a first set of access points are not needed to provide network access to the first set of client devices; and
responsive to determining that the one or more access points are not needed, transfer the one or more access points from the first set of access points to a second set of access points to provide network access to a second set of clients.

10. The medium of claim 1, wherein to dynamically determine that at least one additional access point is needed, the one or more hardware processors are further to determine that network access provided by the first set of access points to the first set of client devices does not meet a service level agreement associated with the first set of client devices.

11. The medium of claim 1, wherein the first set of client devices comprise client devices physically located within a defined area.

12. The medium of claim 1, wherein
one or more access points in the first set of access points are to publish parameters characterizing the environment or operation of the one or more access points.

13. The medium of claim 12, wherein the parameters are published to a master access point in the first set of access points and the master access point dynamically determines that at least one additional access point is needed based on the published parameters.

14. The medium of claim 8, wherein the at least one additional access point simultaneously advertises the same SSID as other access points in the first set of access points and a same SSID as other access points in a second set of access points.

15. A device comprising:
a hardware processor and a memory on which is stored machine readable instructions that are to cause the hardware processor to:
configure a first set of access points to provide network access to a first set of client devices;
dynamically determine that at least one additional access point, not currently in the first set of access points, is needed to provide network access to the first set of client devices; and
add at least one additional access point to the first set of access points at least by configuring the at least one additional access point to provide network access to the first set of client devices, wherein the at least one additional access point is transferred from a first enterprise network to a second enterprise network that comprises the first set of access points.

16. The device of claim 15, wherein to configure the at least one additional access point to provide network access to the first set of client devices, the machine readable instructions are further to cause the hardware processor to modify at least a portion of a configuration of the at least one access point to match a configuration shared across all access points in the first set of access points providing network access to the first set of client devices.

17. The device of claim 15, wherein to dynamically determine that at least one additional access point is needed, the machine readable instructions are further to cause the hardware processor to determine determining at runtime that a current number of client devices in the first set of client devices is above a particular threshold or that a current traffic load of at least one of the first set of access points is above a particular threshold.

18. The device of claim 15, wherein the machine readable instructions are further to cause the hardware processor to dynamically determine that at least one additional access point is needed based on a schedule identifying a number of client devices or a load associated with client devices to be included in the first set of client devices at a particular time.

19. The device of claim 15, wherein, to add the at least one additional access point to the first set of access points, the machine readable instructions are further to cause the hardware processor to remove the at least one additional access point from a second set of access points providing network access to a second set of client devices.

20. The device of claim 15, wherein to dynamically determine that at least one additional access point is needed, the machine readable instructions are further to cause the hardware processor to determine that a received signal strength for one or more signals transmitted between a particular client device in the first set of client devices and a particular access point in the first set of access points is below a particular threshold.

21. The device of claim 15, wherein to dynamically determine that at least one additional access point is needed, the machine readable instructions are further to cause the hardware processor to determine that the additional access point is better suited to provide network access to a particular client device in the first set of client devices than at least one access point in the first set of client devices.

22. The device of claim 15, wherein to add the at least one additional access point to the first set of access points, the machine readable instructions are further to cause the hardware processor to configure the at least one additional access point to advertise a same SSID as other access points in the first set of access points.

23. The device of claim 15, wherein the machine readable instructions are further to cause the hardware processor to:

dynamically determine that one or more access points in the first set of access points are not needed to provide network access to the first set of client devices; and responsive to determining that the one or more access points are not needed, transfer the one or more access points from the first set of access points to a second set of access points to provide network access to a second set of clients.

24. The device of claim 15, wherein to dynamically determine that at least one additional access point is needed, the machine readable instructions are further to cause the hardware processor to determine that network access provided by the first set of access points to the first set of client devices does not meet a service level agreement associated with the first set of client devices.

25. The device of claim 15, wherein the first set of client devices comprises client devices physically located within a defined area.

26. The device of claim 15, wherein one or more access points in the first set of access points are to publish parameters characterizing the environment or operation of the one or more access points.

27. The device of claim 26, wherein the parameters are published to a master access point in the first set of access points and the master access point dynamically determines that at least one additional access point is needed based on the published parameters.

28. The device of claim 22, wherein the at least one additional access point simultaneously advertises the same SSID as other access points in the first set of access points and a same SSID as other access points in a second set of access points.

* * * * *